United States Patent
Nakada et al.

(10) Patent No.: US 8,989,178 B2
(45) Date of Patent: *Mar. 24, 2015

(54) SYSTEM AND METHOD FOR INDICATING CIRCUIT SWITCHED ACCESS AT IMS REGISTRATION

(71) Applicant: Telefonaktiebolaget L M Ericsson (publ), Stockholm (SE)

(72) Inventors: Kazuhiko Nakada, Tokyo (JP); Ralf Keller, Würselen (DE); George Foti, Dollard des Ormeaux (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 291 days.

This patent is subject to a terminal disclaimer.

(21) Appl. No.: 13/684,961

(22) Filed: Nov. 26, 2012

(65) Prior Publication Data

US 2013/0077620 A1  Mar. 28, 2013

Related U.S. Application Data

(63) Continuation of application No. 12/594,182, filed as application No. PCT/IB2007/000843 on Mar. 30, 2007, now Pat. No. 8,340,084.

(51) Int. Cl.
*H04L 12/66* (2006.01)
*H04L 29/06* (2006.01)
*H04L 29/08* (2006.01)

(52) U.S. Cl.
CPC ............ *H04L 12/66* (2013.01); *H04L 65/1016* (2013.01); *H04L 67/306* (2013.01); *H04L 65/1006* (2013.01); *H04L 65/1073* (2013.01)
USPC ........................................................ 370/352

(58) Field of Classification Search
None
See application file for complete search history.

(56) References Cited

U.S. PATENT DOCUMENTS

2005/0058125 A1 * 3/2005 Mutikainen et al. .......... 370/354

* cited by examiner

*Primary Examiner* — Chirag Shah
*Assistant Examiner* — Amar Persaud

(57) ABSTRACT

In IP Multimedia Subsystem (IMS) IMS Control Channel Protocol (ICCP) is used between a user equipment (UE) and IMS Control Channel Function (ICCF) and Session Initiated Protocol (SIP) interface (between to ICCF, Call Session Control Function and Application Server) to support the indication of Circuit Switched (CS) access in header information. The indication can be used by an S-CSCF or AS for different purposes such as routing decision, charging, and presence info.

14 Claims, 8 Drawing Sheets

SYSTEM AND METHOD FOR INDICATING CIRCUIT SWITCHED ACCESS AT IMS REGISTRATION

RELATED APPLICATIONS

This application is a continuation of co-pending U.S. patent application Ser. No. 12/594,182 filed Feb. 24, 2010, which is a 371 of International Application No. PCT/IB2007/000843, filed Mar. 30, 2007, the disclosures of which are fully incorporated herein by reference.

TECHNICAL FIELD

The present invention relates to IP Multimedia Subsystem (IMS). More particularly, and not by way of limitation, the present invention is directed to a system and method for assisting in the IMS user registration process.

BACKGROUND

The following is a list of acronyms used in the body of the specification and their definitions, which shall apply throughout the specification unless otherwise noted.

Acronyms
3GPP: 3rd Generation Partnership Project
ADS: Access Domain Selection
AS: Application Server
CAMEL: Customized Application for Mobile network Enhanced Logic
  CDR: Call Data Record
  CS: Circuit Switch
  CSCF: Call Session Control Function
  CSI: Combination of CS and IMS service
  IA: IMS Adapter
  ICCF: IMS Circuit Switch Control Function
  ICCP: IMS Circuit Switch Control Protocol
  ICS: IMS Centralized Services
  IMPI: IP Multimedia Private Identity
  IMS: IP Multimedia Subsystem
  IMSI: International Mobile Subscriber Identity
  IP-CAN: IP Connectivity Access Network
  ISC: IP multimedia Subsystem Control
  ISUP: ISDN User Part
  MAP: Mobile Application Part
  MGCF: Media Gateway Control Function
  PS: Packet Switched
  P-CSCF Proxy Call Session Control Function
  S-CSCF Serving Call Session Control Function
  SIP Session Initiation Protocol
  TAS: Telephony Application Server
  UE: User Equipment
  URL: Uniform Resource Locator
  USSD: Unstructured Supplementary Service Data
  VCC: Voice Call Continuity
  WCDMA: Wideband Code Division Multiple Access FIG. 1 depicts a high-level block diagram of ICS architecture 100. IMS Centralized Services (ICS) is a proposed work item in Third Generation Partnership Project (3GPP) to make possible IMS services over many types of access networks, such as Circuit Switched (CS) network 102. Service implementation resides in IMS 110 and CS network 102 is used as an access to the services in IMS 110.

As compared to 3GPP Release 7, Voice Call Continuity (VCC) architecture, IMS CS Control Function (ICCF) 106 is introduced to allow signaling not supported over CS signaling (e.g., ISUP) such as IMS registration, mid-call signaling, additional information for call set-up signaling (e.g., SIP URL), to emulate an NMS terminal towards the IMS. Unstructured Supplementary Service Data (USSD) can be used to transport this additional signaling called ICCP (IMS CS Control) 104 in CS network.

In 3GPP Release 7 VCC, the VCC user is not IMS registered at CS access and Telephony Application Server (TAS) 108 has to implement additional mechanisms to provide IMS services to a user. A possible solution, in 3GPP Release 8, it is proposed to support IMS registration from UE 101 using ICCP so that TAS 108 can be informed from S-CSCF by a third party registration procedure that a user is IMS registered. The Serving CSCF is a call session control function for handling user equipment registration and routing for an IP multimedia subsystem. Another CSCF, the Proxy-CSC, is the first point of contact for user equipment and handles security, verification and policy decisions. Currently there is no procedure that informs the IMS whether a user is registered at CS access or at PS access (this is because there was previously no IMS registration for a CS access). IMS can only know that the user is registered at one or more radio accesses, where it is assumed that all accesses are packet-accesses. Packet Switched (PS) access has always been assumed in IMS.

Because of the assumption that the access is always PS access, there are situations that cannot be addressed by the IMS third party registration mechanism up to 3GPP Release 7. For instance, an operator may want to implement local policy in S-CSCF contact address selection to prefer CS access rather than PS access; or vice versa. An operator may want to differentiate charging for CS access and PS access and indicate that difference in IMS CDRs. Also, an operator may want to differentiate the TAS behavior if a user is registered at CS access or PS access (e.g. Call forwarding Video to Video mail box if a user is registered at CS access where video cannot be supported).

It would be advantageous to have a system and method for identifying whether a user is registered at CS or PS access that overcomes the disadvantages of the prior art. The present invention provides such a system and method.

SUMMARY OF THE INVENTION

The present invention provides a change in SIP interface, e.g., among ICCF, CSCF and AS, to support indication of CS access in P-Access-Network-Information header. Impacted nodes are ICCF, S-CSCF and AS. The indication can be used by S-CSCF or AS for different purposes such as routing decision, charging, and presence info.

Thus, in one aspect, the present invention is directed to a method for registering user equipment (UE) in an IP multimedia subsystem (IMS), by sending a registration request to a Serving Call Session Control Function (S-CSCF), wherein the registration request includes a header containing information about access type of the user and contacts related to the access type. The registration request is forwarded to an IMS associated application server which responds to the ICCF. The S-CSCF utilizes the inserted registration request header to implement access rules according to operator or user preference, wherein the header included in the registration request is a P-Access Network-Information header which includes contacts related to Circuit Switched access.

Contact addresses related to Circuit Switched access in the header are arranged in order of use before a normal, Packet Switched access contact and ordering rules regarding contact handling, related to the access type, are based on local policy in the S-CSCF. The local policy in the S-CSCF may be dependent on time of day or according to a subscriber profile.

In another aspect, the present invention is directed to a system for registering user equipment (UE) in an IP multimedia subsystem (IMS), wherein the system comprises means for sending a registration request to a Serving Call Session Control Function (S-CSCE) and the registration request includes a header containing information about access type of the user and contacts related to the access type. The system includes means for forwarding the registration request to an IMS associated application server and means for sending a registration response to the ICCF.

There are means included in the S-CSCF for utilizing the registration request header to implement access rules according to operator or user preference and the header that is included in the registration request is a P-Access Network-Information header that includes contacts related to Circuit Switched access.

Contacts related to Circuit Switched access in the header can be arranged in order before a normal, Packet Switched access contact and the ordering rules, regarding contact handling related to the access type on local policy in the S-CSCF, the local policy in the S-CSCF being dependent on time of day or according to a subscriber profile.

BRIEF DESCRIPTION OF THE DRAWINGS

In the following section, the invention will be described with reference to exemplary embodiments illustrated in the figures, in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

A parameter associated with IMS, "P-Access-Network-Information" already exists to deliver access specific network information, but no additional information indicating access type (CS or PS) is currently included in this parameter. Prior to the introduction of ICS, PS access was the default case. The P-Access-Network-Information header is described below for reference:

```
access-type = "IEEE-802.11" / "IEEE-802.11a" /
"IEEE-802.11b" / "IEEE-802.11g" / "3GPP-GERAN" /
"3GPP-UTRAN-FDD" / "3GPP-UTRAN-TDD" / "ADSL" /
"ADSL2" / "ADSL2+" / "RADSL" / "SDSL" /
"HDSL" / "HDSL2" / "G.SHDSL" / "VDSL" /
"IDSL" / "3GPP2-1X" / "3GPP2-1X-HRPD" /
"DOCSIS" / token
    access-info = cgi-3gpp / utran-cell-id-3gpp / dsl-location / i-wlan-
node-id / ci-3gpp2 / extension-access-info
    extension-access-info = gen-value
    cgi-3gpp = "cgi-3gpp" EQUAL (token / quoted-string)
    utran-cell-id-3gpp = "utran-cell-id-3gpp" EQUAL (token /
    quoted-string)
    i-wlan-node-id = "i-wlan-node-id" EQUAL (token / quoted-string)
    dsl-location = "dsl-location" EQUAL (token / quoted-string)
    ci-3gpp2 = "ci-3gpp2" EQUAL (token / quoted-string)
```

Figure 1:
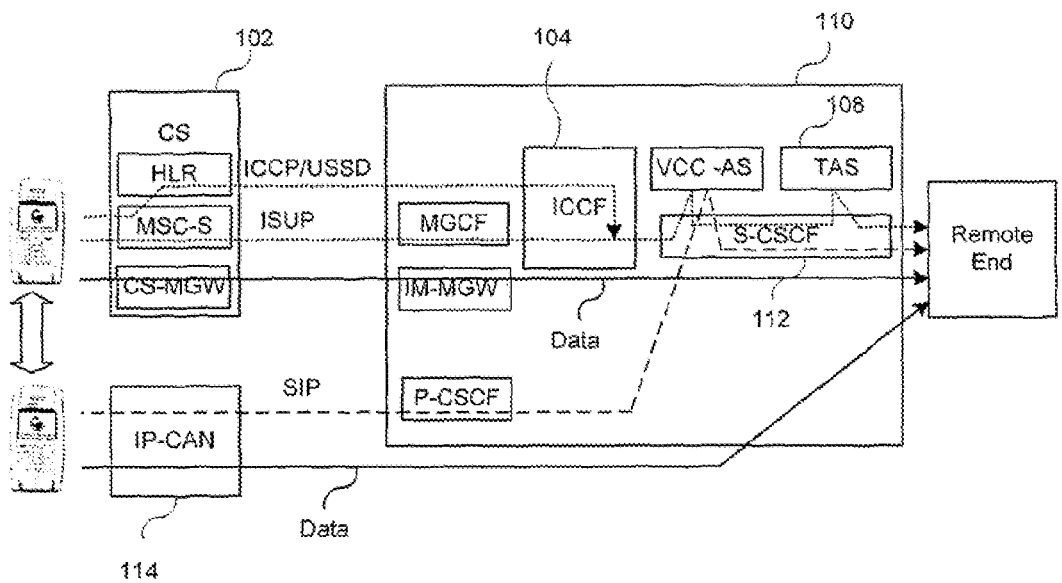
FIG. 1 depicts a high-level block diagram of ICS architecture.
Figure 2:
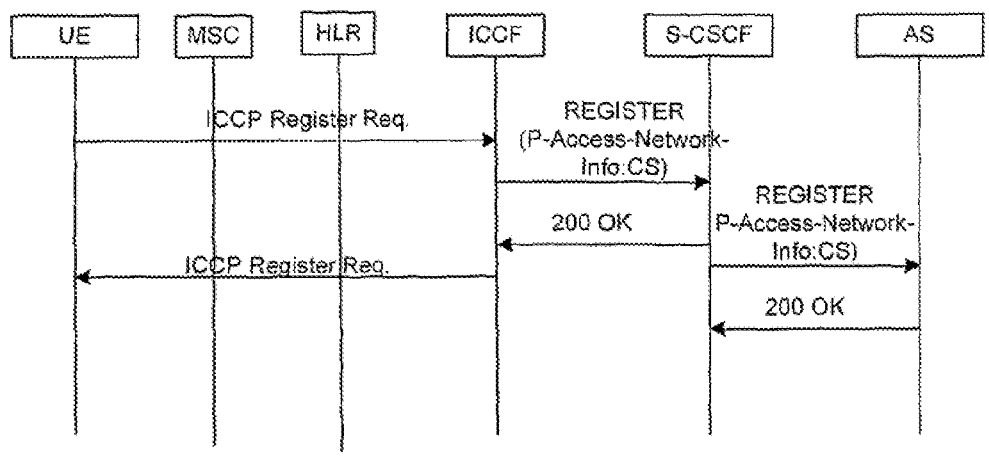
FIG. 2 illustrates a high-level signaling diagram of Circuit Switched Access at registration in accordance with an embodiment of the present invention.

FIG. 2 illustrates a high-level signaling diagram of Circuit Switched Access at registration in accordance with an embodiment of the present invention. P-Access-Network-Information header is extended in the present invention to indicate access type as CS and is inserted by ICCF into an ICCP registration request and delivered to S-CSCF and an Application Server (AS). The Application Server can be Telephony Application Server or Voice Call Continuity AS or any other AS (e.g., Presence Server) which uses registration status to execute its application on top of IP Multimedia Subsystem Control (ISC) interface. The S-CSCF can also use P-Access-Network Information to implement rules following operator or user preference to put contacts related to CS access in different order than PS access.

Figure 3A:
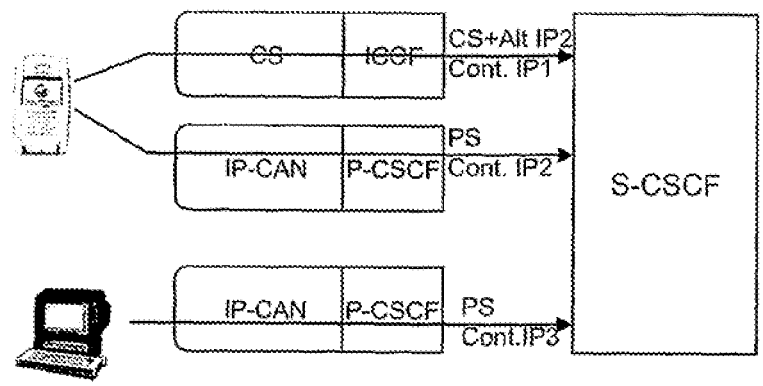
FIGS. 3a, 3b and 3c depict three situations in which a registered device identified in a S-CSCF according to embodiments of the present invention.
Figure 3B:
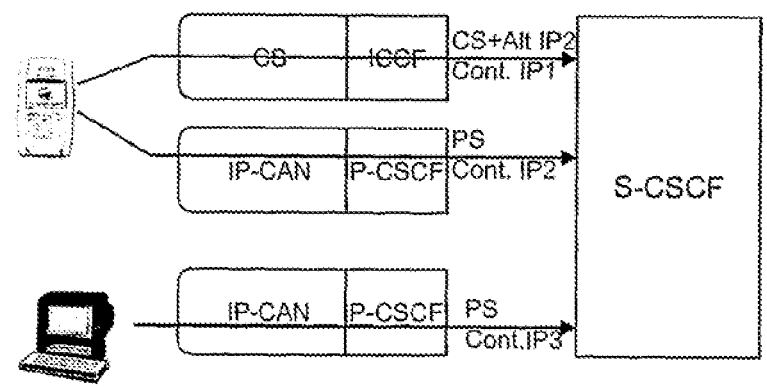
Figure 3C:
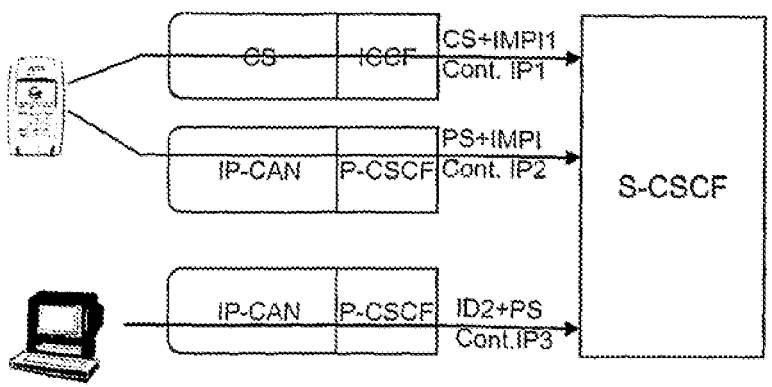

FIGS. 3a, 3b and 3c depict three situations in which a registered device is identified in a S-CSCF according to embodiments of the present invention. Differentiation between CS and PS UE devices is accomplished utilizing information included in the registration message provided by ICCF using ICCP. FIG. 3a depicts utilizing a "Device ID" from UE during registration both in CS and in PS. This is a new parameter in ICCP registration request and in a SIP REGISTER message and S-CSCF needs to store the "Device ID" information with contact IP address. For example, if two devices are registered, one UE with CS and PS access, and another UE being a PC with only PS access, the information stored in S-CSCF appears as:

```
Public User ID --- Contact IP1 --- CS access --- Device ID1
                +-- Contact IP2 --- PS access --- Device ID1
                +-- Contact IP3 --- PS access --- Device ID2
```

Note 1
IP1 is ICCF IP address in CS access case.

FIG. 3b illustrates including at least one "alternative contact" from UE during CS registration. In an ICCP registration request and REGISTER message, S-CSCF needs to store the "alternative contact" information with contact IP address for CS access. S-CSCF can identify that two registrations belong to the same device matching contact address and alternative contact address. For example, if case 2 devices are registered, one UE with CS and PS access, and another UE being a PC with only PS access, the information stored in S-CSCF appears as:

```
Public User ID --- Contact IP1 --- CS access --- Alt contact IP2
                +-- Contact IP2 --- PS access
                +-- Contact IP3 --- PS access
```

Note
IP1 is ICCF IP address in CS access case.

FIG. 3c depicts using IP Multimedia Private Identity (IMPI) to identify the device. IMPI can be derived from IMSI delivered in ICCP registration request (MAP USSD message), and can be populated in an existing Authorization header in a REGISTER message. S-CSCF needs to store the IMPI information with contact IP address to be used for routing decision. For example, if two devices are registered, one UE with CS and PS access, and another UE as being a PC with only PS access, the information stored in S-CSCF looks as follows:

Public User ID --- Contact IP1 --- CS access --- IMPI1
+-- Contact IP2 --- PS access --- IMPI1
+-- Contact IP3 --- PS access --- IMPI2

Note 1
IP1 is ICCF IP address in CS access case.
Note 2
IMPI1 is derived from IMSI and IMPI2 is stored in IMSI attached to PC.

FIGS. 4a-4d illustrate situations in which ordering in the S-CSCF is changed in accordance with an embodiment of the present invention. The S-CSCF can also use P-Access-Network Information to implement rules following operator or user preference to put contacts related to CS access in different order than a typical PS access.

Figure 4A:
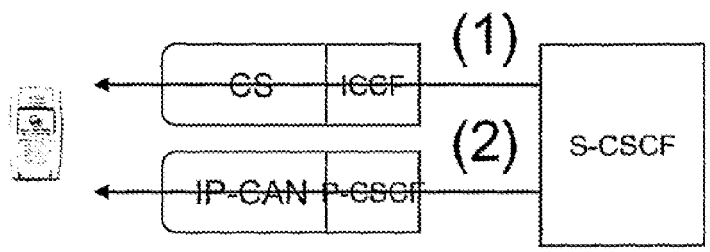
FIGS. 4a-4d illustrate situations in which ordering in the S-CSCF is changed in accordance with an embodiment of the present invention.
Figure 4B:
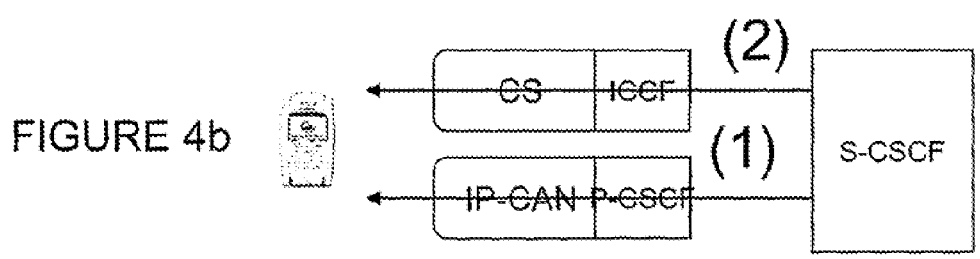
Figure 4C:
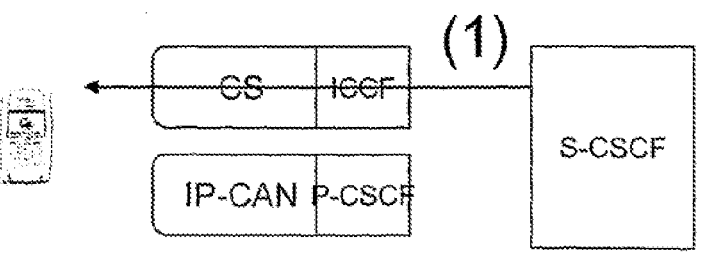
Figure 4D:
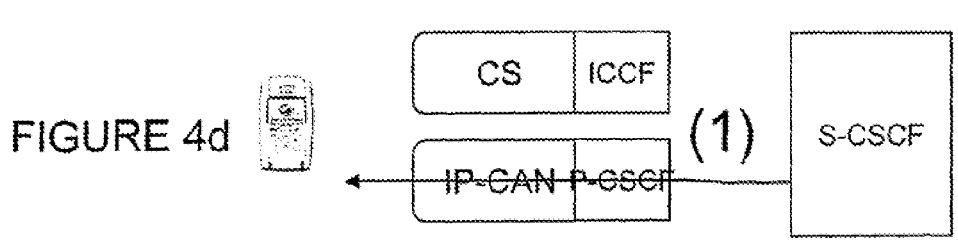

Currently, contact handling is only based on q-value from the user. The q parameter is used to indicate priority value of the contacts for routing from a user. The present invention provides for an ordering rule that can be based on local policy in S-CSCF and may be different, e.g., dependent on time of day or per subscriber. Possible orderings in the S-CSCF may include:

Try CS access contact first and then try PS access if no reply (FIG. 4a);
Try PS access contact first and then try CS access if no reply (FIG. 4b);
Try CS access contact only if both CS and PS access contacts are registered (if only one contact is registered, try the registered contact) (FIG. 4c); and alternatively,
Try PS access contact only if both CS and PS access contacts are registered of only one contact is registered, try the registered contact) (FIG. 4d). These options would expand contact handling in the S-CSCF which is only based on q-value from the user today.

Figure 5A:
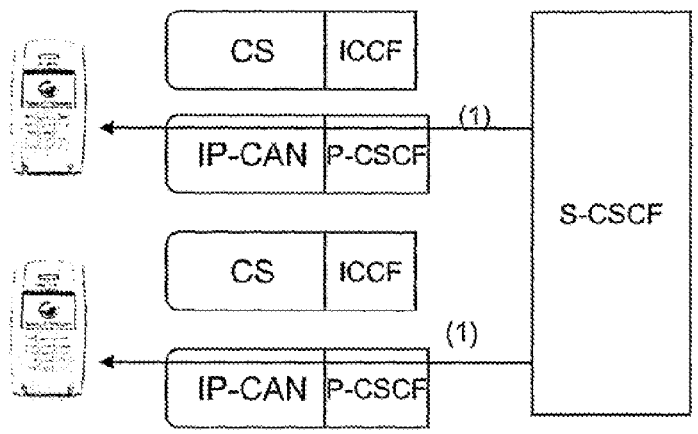
FIGS. 5a-5d depict situations wherein different forking actions may be taken according to an embodiment of the present invention.
Figure 5B:
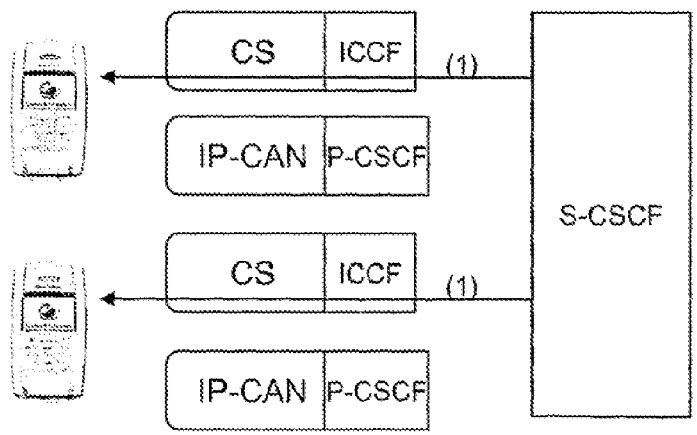
Figure 5C:
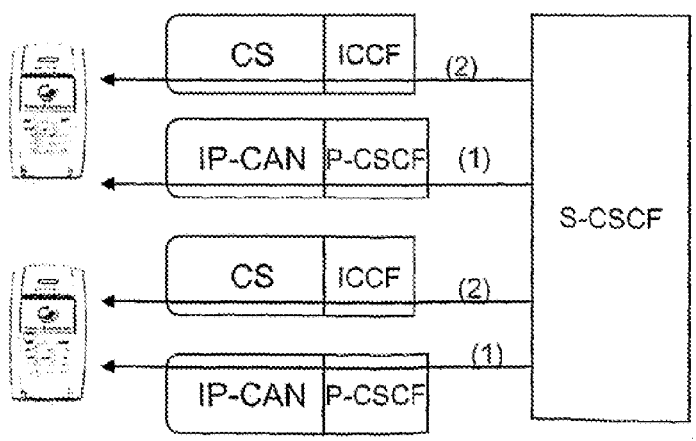
Figure 5D:
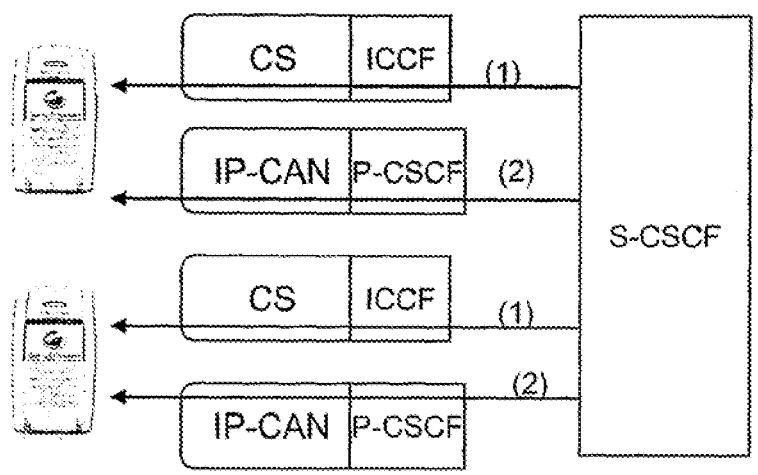

FIGS. 5a-5d depict situations wherein different forking actions may be taken according to an embodiment of the present invention. The S-CSCF can also use the P-Access-Network-Information to implement rules to suppress forking to contacts for the same device registered over multiple accesses. The forking rule may be based on local policy in S-CSCF and may be different, e.g., dependent an time of day. Possible forking rules include:

Fork to only PS access contact if a user is registered at both CS and PS access (FIG. 5a);
Fork to only CS access contact if a user is registered at both CS and PS access (FIG. 5b).
Fork to PS access contact first, then to CS contact (FIG. 5c) and
Fork to CS access contact first, then fork to PS contact (FIG. 5d).

The rule can be also combined with sequential ringing so that:
Fork to only PS access contact if a user is registered at both CS and PS access. If none of the forked devices reply, try CS access contact and
Fork to only CS access contact if a user is registered at both CS and PS access. If none of the forked devices reply, try PS access contact.

The forking rule can be based on local policy in S-CSCF and may be different e.g. dependent on time of day.

Figure 6A:
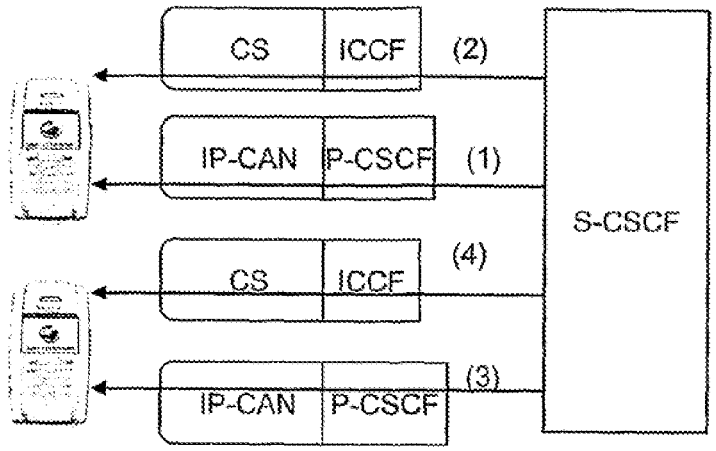
FIGS. 6a-6f illustrate situations regarding different sequential ringing actions according to an embodiment of the present invention.
Figure 6B:
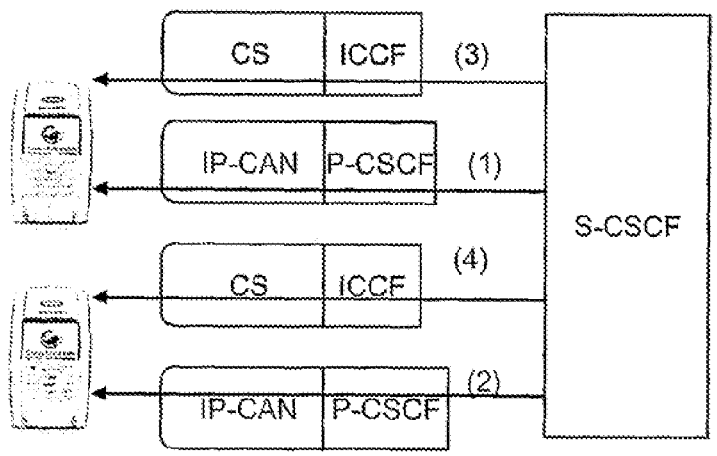
Figure 6C:
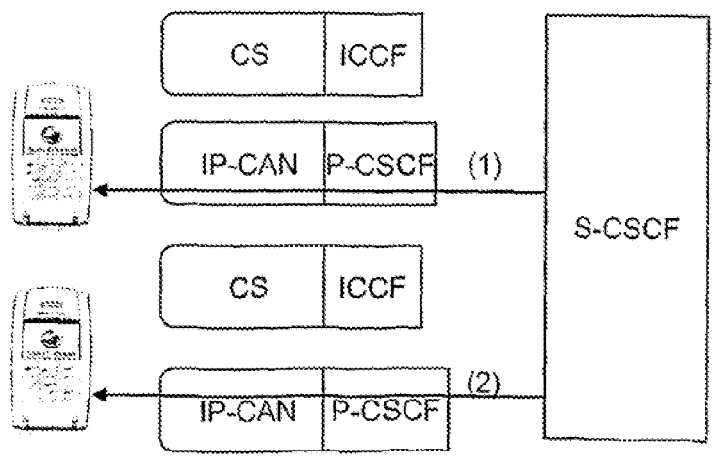
Figure 6D:
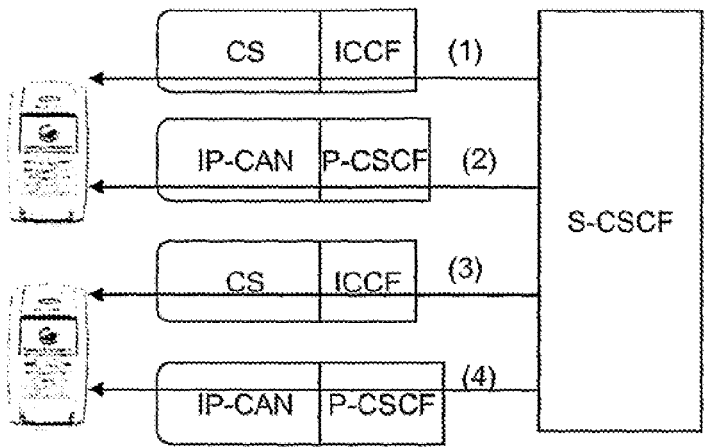
Figure 6E:
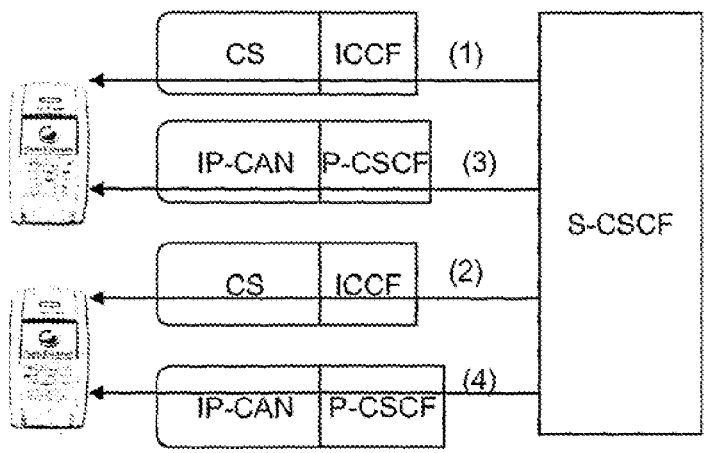
Figure 6F:
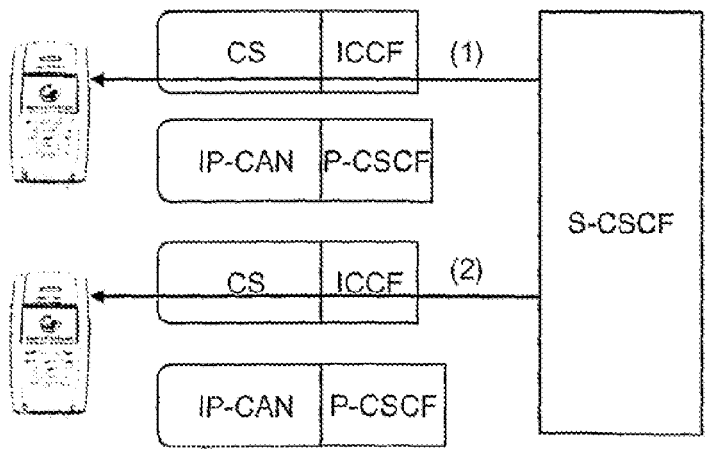

FIGS. 6a-6f illustrate situations regarding different sequential ringing actions according to an embodiment of the present invention. The S-CSCF can use the P-Access-Network-Information to sequentially ring the contacts in a way that contacts related to the same device but to different accesses are tried in sequence before (or after) trying to ring contacts pointing to other devices. In other words, possible sequential ringing rules include:

1) While sequentially ringing different devices, try PS access contact first if a user is registered at both CS and PS access. If no reply:
Try CS access before trying another device (FIG. 6a);
Try CS access contact after all sequential ringing to other devices are not responded to (FIG. 6b); and
do not include CS access contact (FIG. 6c);

2) While sequentially ringing different devices, try CS access contact first if a user is registered at both CS and PS access. If no reply:
Try PS access before trying another device (FIG. 6d);
Try PS access contact after no response to all sequential ringing to other devices (FIG. 6e); and
do not include P access contact (FIG. 6f).

The sequential ringing rule can be based on local policy in S-CSCF and may be different, e.g., depending on time of day.

These parameters can be included in P-Access-Network-Information or can be included as a new SIP header parameter. The AS can use the contact information to differentiate between CS access and PS access for Access Domain Selection (ADS).

In VCC 3GPP Release 7, the VCC application server implements ADS. When ADS selects PS access, the call is routed to the registered contact in PS access. When ADS selects CS access, since S-CSCF does not have any registered contact at CS access, ADS re-targets a call using a suitable routing number to be able to route to CS access (called CS routing number), to bypass the contact handling in the S-CSCF. VCC AS may know the PS registration status using 3rd party registration mechanism when user is registered at PS access but needs to implement specific non-IMS mechanism to know that a user is registered at CS access. IMS 3rd party registration may also be used to determine the registration status at CS access, which would simplify the ADS implementation.

The AS and S-CSCF can issue a CDR including P-Access network-Information so that an operator can differentiate the charging scheme for a communication over PS access and a communication over CS access. P-Access-network-Information can be also included in the INVITE request when the session is established from ICCF (not only REGISTER message when user registers at CS access) in order to indicate that the communication is over CS access.

Figure 7:
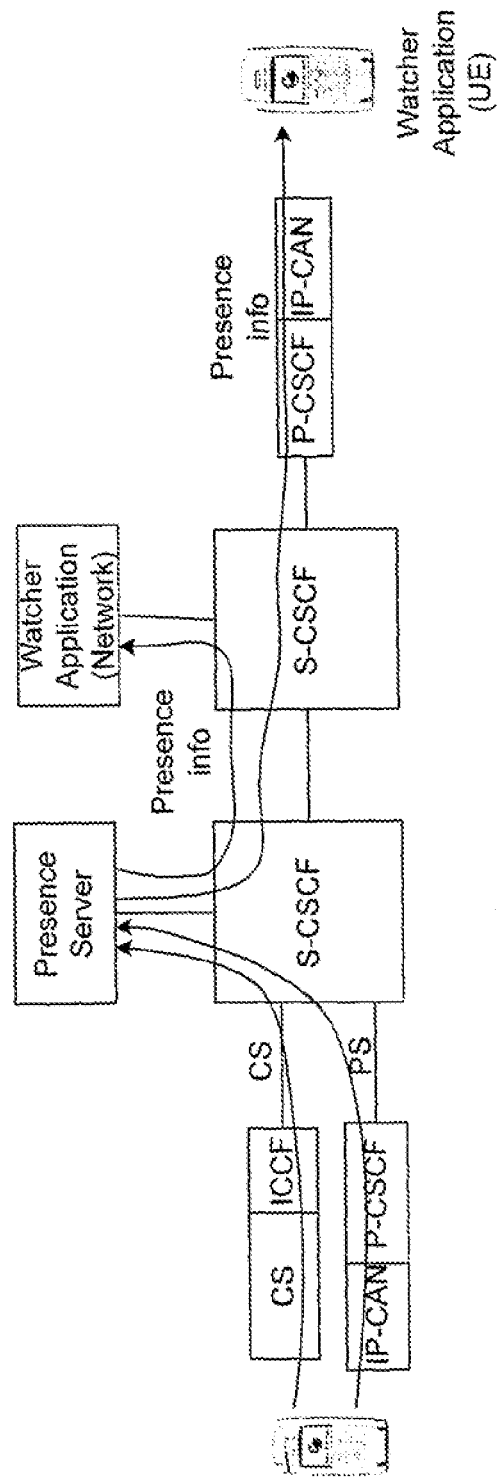
FIG. 7 depicts Circuit Switched access indication to a presence server according to an embodiment of the present invention.

FIG. 7 depicts Circuit Switched access indication to a presence server according to an embodiment of the present invention. A presence server, being an SIP AS can also receive P-Access-Network-Information during third party registration procedures to determine whether the user is in PS access or in CS access and can provide better information to watchers. A "Watcher" in this context is a user subscribed to presence information of an ICS user and "watches" the presence status of an ICS user. A watcher uses the presence status to decide which access should be used to initiate multimedia communication s that if the user is registered at PS access, the watcher can initiated multimedia call over PS access (e.g., voice and video over PS access). Such a watcher may reside in a UE or in a network node.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A Serving Call Session Control Function in an IP Multimedia Subsystem, IMS, the S-CSCF comprising:
   means for receiving an IMS registration request for a user equipment, UE;
   means for utilizing information in a P-Access Network Information header of the IMS registration request, the P-Access Network Information header being inserted into the IMS registration request in response to a determination that the registration request originates from a circuit switched access network; and
   means for returning a registration response and for forwarding the registration request to an IMS associated application server,
      wherein the information utilized in the P-Access Network Information header includes:
         information regarding the circuit switched access type, and
         at least one contact for contacting the UE using the circuit switched access type, and
      wherein the Serving Call Session Control Function is configured to implement access dependent rules according to IMS operator or user preference.

2. The S-CSCF of claim 1, wherein the Serving Call Session Control Function is configured to apply ordering rules regarding contact handling related to the access type, depending on a local policy in the S-CSCF, the local policy being dependent on time of day or according to a subscriber's profile.

3. The S-CSCF of claim 1, wherein the at least one contact for contacting the UE using the circuit switched access type is arranged in order before or after a at least one contact for contacting the UE, or another device registered for a user of the UE, using a packet switched access type.

4. A method for registering a user equipment, UE, in a Serving Call Session Control Function, S-CSCF, of an IP multimedia subsystem, IMS, the method comprising:
   receiving an IMS registration request for the UE;
   utilizing information in a P-Access Network Information header of the IMS registration request, the P-Access Network Information header being inserted into the IMS registration request in response to a determination that the registration request originates from a circuit switched access network;
   implementing access dependent rules according to IMS operator or user preference; and
   returning a registration response and forwarding the registration request to an IMS associated application server,
      wherein the information utilized in the P-Access Network Information header includes:
         information regarding the circuit switched access type, and
         at least one contact for contacting the UE using the circuit switched access type.

5. The method of claim 4, comprising applying ordering rules regarding contact handling related to the access type dependent on a local policy in the S-CSCF, the local policy being dependent on time of day or a subscriber's profile.

6. The method of claim 4, wherein the at least one contact for contacting the UE using the circuit switched access type is arranged in order before or after a contact for contacting the UE, or another device registered for a user of the UE, using a packet switched access type.

7. An IMS CS Control Function (ICCF) in an IP Multimedia Subsystem the ICCF comprising:
   an associated receiver means for receiving a registration request from a user equipment (UE);
   insertion means for inserting a P-Access Network Information header into a registration request to the IMS in response to a determination that the registration request originates from a circuit switched access network; and
   means for forwarding said registration request to the IMS for the IMS to utilize the P-Access Network Information header for implementation of access dependent rules,
      wherein the P-Access Network Information header includes:
         information regarding the circuit switch access type, and
         at least one circuit switched contact for the UE.

8. The ICCF of claim 7, comprising means for receiving a registration response from the IMS.

9. A method for registering a user equipment (UE) in IP Multimedia Subsystem (IMS) CS Control Function (ICCF) the method comprising the steps of:
   receiving a registration request from a user equipment (UE);
   determining whether the registration request originates from a circuit switched access network;
   responsive to a determination that the registration request originates from a circuit switched access network inserting a P-Access Network Information header into a registration request to the IMS; and
   forwarding said registration request to the IMS for the IMS to utilize the P-Access Network Information header for implementation of access dependent rules,
      wherein the P-Access Network Information header includes:
         information regarding the circuit switch access type, and
         at least one circuit switched contact for the UE.

10. The method of claim 9, comprising receiving a registration response from the IMS.

11. An application server for executing an application associated with an IP Multimedia Subsystem (IMS) and being on top of an IMS Control Interface (ISC), the application server comprising:
   a processor and a persistent memory, the memory having instructions stored therein that, when executed by the processor, cause the application server to perform the following steps:
   receiving an IMS registration request for a user equipment (UE) from a Serving Call Session Control Function (S-CSCF);
   utilizing information in a P-Access Network Information header of the IMS registration request, the P-Access Network Information header being inserted into the IMS registration request in response to a determination that the registration request originates from a circuit switched access network; and
   returning a registration response to the S-CSCF,
      wherein the information utilized in the P-Access Network Information header includes:
         information regarding the circuit switched access type, and
         at least one contact for contacting the UE using the circuit switched access type.

12. The application server of claim 11, wherein the application server is a Telephony Application Server, a Call Continuity Application Server, or a Presence Server.

13. A method of executing an application associated with an IP Multimedia Subsystem, IMS, and being on top of an IMS Control Interface, ISC, the method comprising the steps of:
- receiving an IMS registration request for a user equipment (UE), from a Serving Call Session Control Function (S-CSCF);
- utilizing information in a P-Access Network Information header of the IMS registration request, the P-Access Network Information header being inserted into the IMS registration request in response to a determination that the registration request originates from a circuit switched access network; and
- returning a registration response to the S-CSCF,
  - wherein the information utilized in the P-Access Network Information header includes:
    - information regarding the circuit switched access type, and
    - at least one contact for contacting the UE using the circuit switched access type.

14. The method of claim 13, wherein the application is a Telephony Application, a Call Continuity Application, or a Presence Application.

* * * * *